United States Patent [19]

Kwiecinski et al.

[11] Patent Number: 4,661,397

[45] Date of Patent: Apr. 28, 1987

[54] POLYBUTADIENE BONDED EXTREMELY FLEXIBLE POROUS MICA TAPE

[75] Inventors: James R. Kwiecinski, Wilkins Township, Allegheny County; Donald D. Jerson, Norvelt, both of Pa.

[73] Assignee: Westinghouse Electric Corp., Pittsburgh, Pa.

[21] Appl. No.: 836,869

[22] Filed: Mar. 7, 1986

[51] Int. Cl.$^4$ .................... B32B 19/02; B32B 19/06; H01B 3/04; H01B 3/30

[52] U.S. Cl. ...................................... 428/241; 156/53; 174/120 C; 174/120 SR; 310/215; 336/209; 428/248; 428/252; 428/283; 428/286; 428/324; 428/363; 428/450; 428/451; 428/454; 428/521

[58] Field of Search ....... 156/53; 174/120 C, 120 SR; 310/215; 336/209; 428/241, 248, 252, 283, 286, 324, 363, 521, 450, 451, 454

[56] References Cited

U.S. PATENT DOCUMENTS 4,020,017 4/1977 Smith et al. .
4,157,414 6/1979 Smith .

Primary Examiner—James C. Cannon
Attorney, Agent, or Firm—Daniel P. Cillo

[57] ABSTRACT

A dry, highly flexible, porous, essentially solvent free mica insulation tape is made, containing a curable, resinous, bonding composition containing polybutadiene containing from 70 weight percent to 100 weight percent of 1,2-polybutadiene, and catalyst, where the tape contains from 2 weight percent to 15 weight percent of polybutadiene based on the total weight of the resin bonded tape, and where the tape is capable of subsequent impregnation by an impregnating resin.

12 Claims, 2 Drawing Figures

POLYBUTADIENE BONDED EXTREMELY FLEXIBLE POROUS MICA TAPE

BACKGROUND OF THE INVENTION

Impregnated, resin bonded mica tape is well known as a high performance insulating winding tape, particularly useful as ground insulation for high voltage motor or generator coils, as taught for example, by Smith et al. in U.S. Pat. No. 4,020,017. The conventional method used to manufacture resin bonded mica tape ground insulation involves two separate operations and two separate polymeric or resinous solutions. The mica sheet stock consists of small mica flakes held together only by molecular attraction and possibly some hydrogen bonding. This material is very weak and is treated with a micabond resin. In practice, an epoxy or polyester resin is applied in a solvent solution to the mica flake sheet as the mica bond resin. After the solvent is removed in a conveyor oven, the resin bonds the mica flakes together. At this stage the micabond resin is dried but not cured, i.e., B-staged. As a result of this procedure the mica sheet can then be further processed.

Although some strength has been added to the mica by this resin treatment, it is far from what is required if it is to be wound around motor or generator coils. To provide the required level of tensile strength and support, the treated mica sheet must be bonded to a glass fabric or other suitable flexible backing material. In conventional practice, the resin bonded mica sheet is directed to a second process station in which an adhesive in a solvent solution is applied either to the mica or to the glass fabric or other backing. The solvent is removed by passage of the sheet through a conveyor oven, and the tacky adhesive surface is directed to come in contact with the surface to be bonded. In most cases, the resin bonded mica tape is manufactured as a porous material, so that subsequent vacuum pressure impregnation with additional insulating resin is possible.

Smith, in U.S. Pat. No. 4,157,414, taught use of a single resin to both bond the mica flakes in the mica sheet together, and to bond the mica sheet to the backing. Smith rejected epoxy or polyester impregnants and used a mixture of 1,2-polybutadiene; 1,4-polybutadiene; 0.25 part to 25 parts per 100 parts total polybutadiene of vinyl monomer, such as 1 vinyl napthalene, vinyl carbazole, vinyl anthracene, or the like; and reaction catalyst. Smith required the use of vinyl monomer in order to provide a non-tacky, highly loaded, yet flexible mica tape, which could be wound for storage without blocking and have a satisfactory shelf life. While, in passing, Smith mentions that in some instances these resin bonded mica tapes could be porous, containing as low as 2 weight percent resin loading, allowing further impregnation with epoxy, polyester, or the like resin; the preferred mica tape contains from about 22 weight percent to about 40 weight percent resin loading. The primary teaching is a void free, completely resin impregnated prepreg-winding insulation tape.

Such vinyl modified polybutadiene bonded mica tapes have proved to be stiffer than desired after drying to the B-stage, presenting some problems during coil winding. What is needed is a resin bonded, porous mica tape that is both non-tacky and extremely flexible after drying to the B-stage.

SUMMARY OF THE INVENTION

The above problems have been solved and the above needs met by contacting flexible sheet insulation containing mica with a homogeneous, catalyzed, polymerizable micabond resin containing: (1) polybutadiene consisting essentially of 1,2-polybutadiene, (2) solvent for the polybutadiene, and (3) an amount of catalyst effective to cure the polybutadiene at resin cure temperatures. This micabond composition is applied to a flexible mica sheet material and dried to the B-stage, to provide a resin composition loading of from 2 weight percent to 15 weight percent including from 0 weight percent to about 1 weight percent solvent residue.

Solvents in the composition applied to the mica tape are removed, generally by flash off heating, at a temperature and for a time effective to remove about 99% to 100% of the solvent initially present in the tape. Solvent flash off can be accomplished at a micabond composition temperature of from about 65° C. to about 120° C. for about 1 minute to 6 minutes, without substantially reacting the polybutadiene beyond the B-stage, i.e. the stage where the resin is dried yet capable of further complete cure to the C-stage. This provides a surprisingly non-tacky, highly flexible, porous, impregnating resin permeable mica winding tape insulation requiring only minimal solvent removal upon further complete cure. The composition of this invention does not contain any vinyl monomers, which monomers are specifically excluded.

While 100 weight percent of 1,2-polybutadiene can be used, preferably the polybutadiene will contain from 70 weight percent to 95 weight percent of 1,2-polybutadiene and from 5 weight percent to 30 weight percent 1,4-polybutadiene or cyclized polybutadiene. The resin bonded, porous mica tapes of this invention possess excellent tensile strength and good solvent and chemical resistance properties after heat curing, allowing it to be used on commercial coil taping machines. It also allows ease of subsequent impregnation, usually by vacuum-pressure impregnation techniques, with epoxy, polyester, polybutadiene, or the like resins.

BRIEF DESCRIPTION OF THE DRAWINGS

For a better understanding of the invention, reference may be made to the preferred embodiments exemplary of the invention, shown in the accompanying drawings in which.

DESCRIPTION OF THE PREFERRED EMBODIMENTS

Figure 1:
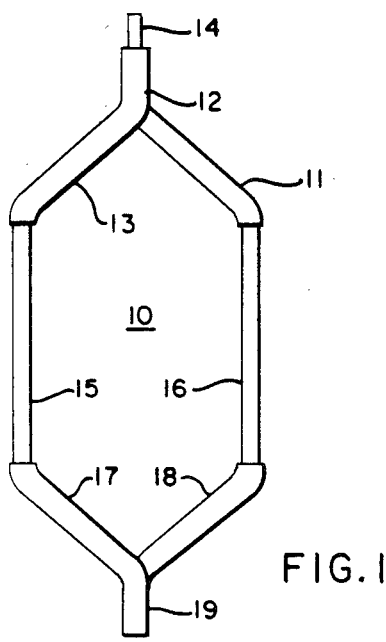
FIG. 1 is a plan view of a closed electrical member having two slot portions.

The base material used in this invention is polybutadiene, preferably containing from about 70 weight percent to about 95 weight percent of 1,2-polybutadiene and about 5 weight percent to about 30 weight percent of 1,4-polybutadiene or additional butadiene forms, such as cyclized polybutadiene. These materials have the following basic structural repeating units:

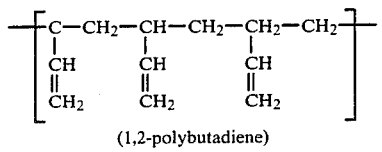

(1,2-polybutadiene)

and

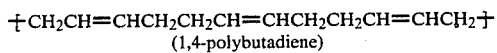
(1,4-polybutadiene)

While highly expensive, 100 weight percent of 1,2-polybutadiene can also be used. A description of polybutadiene properties is given in *Plastics Materials* by J. A. Brydson, 1966, pages 261 to 267. The 1,4-polybutadiene can exist in cis and trans form, and the 1,2-polybutadiene can exist in isotactic, syndiotactic and atactic forms. Use of the term "polybutadiene", will be meant to include mixtures of 1,4-polybutadiene and 1,2-polybutadiene in any of the above described or additional forms. These polybutadienes will be the sole resinous component of the micabond compositions of this invention, all use of coreactive vinyl monomers being excluded.

Less than 70 weight percent of 1,2-polybutadiene in the butadiene component of the micabond composition, a tacky mica tape will result without use of vinyl monomer and blocking of the tape may result upon rolling for storage. Usually, 1,2-polybutadiene is in mixture with 1,4-polybutadiene and solvent. Most preferred mixtures contain from 70 weight percent solids to 90 weight percent solids of 1,2-polybutadiene with the remaining solids being 1,4-polybutadiene. Mixtures of differing weight percent solids of 1,2-polybutaidene are also most preferred. For example, one particularly useful micabond composition contains an admixture of: (A) from about 6 weight percent to 100 weight percent, preferably 10 weight percent to about 90 weight percent of a flowable, high molecular weight mixture containing: from 80 weight percent to 90 weight percent solids of 1,2-polybutadiene and from 10 weight percent to 20 weight percent solids of 1,4-polybutadiene, dissolved in a solvent, such as heptane, where the average molecular weight of the combined polybutane is from about 22,000 to about 55,000, and (B) from 0 weight percent to about 94 weight percent, preferably 10 weight percent to about 90 weight percent of a liquid, low molecular weight mixture containing: from 70 weight percent to 80 weight percent solids of 1,2-polybutadiene and from 20 weight percent to 30 weight percent solids of 1,4-polybutadiene, where the average molecular weight of the combined polybutadiene is from about 200 to about 18,000. This admixture will generally contain an average of from about 71 weight percent to about 90 weight percent 1,2-polybutadiene based on the weight of total polybutadiene present.

A reaction catalyst is needed to promote curing. Peroxide compounds are used as a free-radical type catalyst for this polymerization reaction. Useful catalysts of this type include, among others, the following catalytic peroxides: Benzoyl peroxide, dicumyl peroxide, lauroyl peroxide, methyl ethyl ketone peroxide and 2,5-dimethyl-2,5bis(benzoylperoxy hexane), and mixtures thereof. Azo compounds, having the structural formula R—N=N—R where R can be alkyl or aryl, can also be used as the free radical type catalyst. Useful azo compounds include, among others:

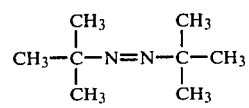

2-(tert-butylazo)isobutryonitrile; 2-tert-butylazo-2,4-dimethylpentane, and preferably 1-terbutylazo-1-phenylcyclohexane.

The peroxide or azo catalyst or their mixtures must be effective to promote a gelling effect to the composition, at composition temperatures over about 130° C. The effective range of organic peroxide or organic azo catalyst is between about 0.25 part to about 5 parts, and preferably 0.8 part to 3 parts, per 100 parts polybutadiene. Over about 5 parts shortens the storage lifetime of the mica tape. Under about 0.25 part causes very long cure rates. These catalysts may be used in pure or in commercial, plasticized paste form.

The polybutadiene system must be mixed with a solvent. The solvent can be selected from the group consisting of ketones; aliphatic hydrocarbons, such as hexane, heptane and octane; cycloaliphatic hydrocarbons, such as cyclohexane; aromatic hydrocarbons, such as benzene and arene; and cyclic ethers, such as dioxane and tetrahydrofuran, and their mixtures. The ketone will have from 3 to 6 total carbon atoms in the molecule. Particularly useful ketones are acetone, methyl ethyl ketone and methyl isobutyl ketone. The arene is preferably selected from the group of toluene, ethylbenzene, xylene and their mixtures. Ketones or arenes having higher molecular weights than those described above will present problems of solvent flash off without catalyzing the resin system, i.e., solvent removal would require temperatures of about 175° C., which would activate the catalyst and begin resin polymerization. Of all these above enumerated solvents, toluene in combination with methyl ethyl ketone is preferred.

The solvent content of the polybutadiene micabond composition should be within a weight ratio of total polybutadiene solids: solvent, of from about 1:0.5 to 9, i.e., a solids content of from about 1/1.5=66% to 1/10=10%. More solvent will be needed when large amounts of high molecular weight mixtures containing 85 weight percent to 100 weight percent solids of 1,2-polybutadiene are used in the polybutadiene component. The viscosity of the micabond solution must be between about 1 cps. to about 1000 cps. at 25° C. cps., but preferably between about 1 cps. to about 35 cps. at 25° C. By operating within these ranges, providing a highly flowable composition, complete bonding of the tape can be attained after drying, i.e. about 2 weight percent to about 15 weight percent of the tape will consist of dried polybutadiene composition, including from 0 weight percent to only up to about 1 weight percent of solvent residue, based on the weight of polybutadiene, solvent residue, backing and mica. Since a minimal amount of polybutadiene is used to bond the mica and backing, flexibility is aided and solvent removal during drying to the B-stage is essentially complete. After winding and complete cure, all of the solvent residue is removed.

In the method of this invention: the polybutadiene solution is added to a container; the catalyst is added slowly with stirring to the solution at temperatures of up to about 35° C., to form a homogeneous micabond solution admixture; and the solution admixture is applied, in an amount to provide a final resin composition loading in the B-staged tape, including possibly some minor amount of solvent in the range of from about 2 weight percent to about 15 weight percent resin composition, preferably from about 5 weight percent to about 13 weight percent, to an insulation substrate, which will contain mica sheet in the form of paper, integrated flake paper, flakes, or large splittings, by any suitable means such as by brushing, dipping, spraying, etc. The mica sheet insulation containing the contacting applied solution is generally heated at a temperature and for a time, generally about 1 minute to 6 minutes, at a mica sheet and micabond composition temperature of between about 65° C. to 120° C., i.e. an oven temperature of between about 85° C. to 150° C., effective to drive off or flash off substantially all, i.e. at least about 9 weight percent of the solvent, to provide an essentially solvent free, B-staged micabond resin composition. Almost all, or all of the solvent can be removed during B-stage drying because the minimal amount of resin used is spread out and in thin layers. Solvent could also be removed by gas pressure drying or by a suitable vacuum process. At least about 99 weight percent of the solvent present in the solution should be removed to form a composition of about 99 to 100 percent polybutadiene solids at this point, so that minimal solvent removal is required upon final curing of the insulation.

Finally, the insulation is cooled to room temperature, at which time it is porous, i.e., at least about 50 percent porous, extremely tack-free, and can be wound onto a takeup reel without blocking or sticking, and stored for up to 1 year without losing any flexibility and tack-free properties. It can then be applied, either by hand or using commercial coil wrapping machines, to coils and other metallic electrical conductors as a curable, porous, ground wall insulating tape which can be further impregnated using vacuum-pressure impregnation of well known impregnating resins having viscosities of from about 10 cps. to about 2,500 cps. at 25° C.

The polybutadiene composition, after B-stage drying, will contain up to about 1 weight percent solvent residue based on polybutadiene, mica, backing layer, solvent, catalyst weight. The polybutadiene in the mica sheet is capable of being fully cured, generally at a resin temperature of at least 130° C., for 2 hours to 35 hours, to remove any solvent residue and to form an infusible resin bond, by complete catalytic polymerization with the catalyst.

One type of a closed full coil 10 which may be prepared in accordance with the present invention is illustrated in FIG. 1. The full coil is a copper or aluminum electrical conductor wrapped with winding tape, and comprises an end portion comprising a tangent 11, a connecting loop 12 and another tangent 13 with bare leads 14 extending therefrom. Straight slot portion 15 and 16 of the coil which have been hot pressed to cure the resin and to form them to predetermined shape and size, are connected to the tangents 11 and 13, respectively. These slot portions are connected to other tangents 17 and 18 connected through another loop 19.

Figure 2:
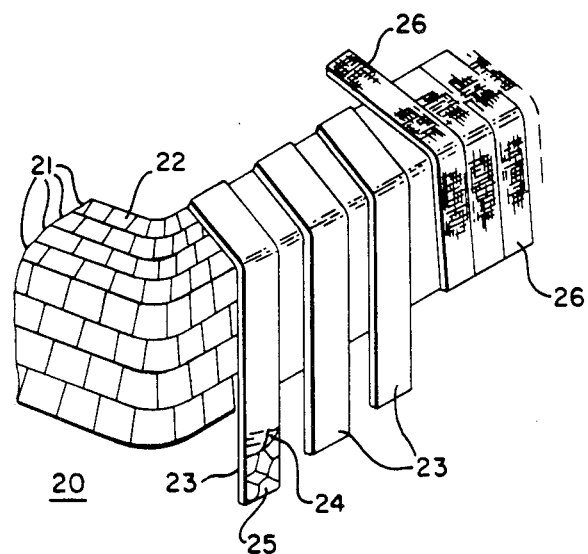
FIG. 2 is a fragmentary view in perspective showing part of an electrical coil member being wound with the extremely flexible, porous mica tape of this invention.

Referring to FIG. 2 of the drawings, there is illustrated a coil 20, comprising a plurality of turns of conductors 21. Each turn of the conductor 21 consists essentially of a copper or aluminum bar or wire wrapped with turn insulation 22. The turn insulation 22, preferably is prepared from a fibrous sheet or strip impregnated with a bonding resinous insulation. While the bonding resinous insulation may consist solely of a coating of uncured varnish or resin, it is preferred that it comprise a wrapping of fibrous material treated with a bonding resin. The resin applied to the turn insulations to bond them together may be a phenolic resin, an alkyd resin, a melamine resin or the like, or mixtures of any two or more of these.

The turn insulation is not adequate to withstand the severe voltage gradients that will be present between the conductor and ground when the coil is installed in a high-voltage electrical machine. Therefore, ground insulation for the coil, such as that of this invention, is provided by wrapping one or more layers of porous, flexible, micaceous insulation, such as mica paper or preferably a composite mica tape 23 about the conductors 21. Such composite tape 23 comprises a pliable backing sheet 24 of, for example, cellulose paper, cotton or line fabric, glass cloth or fibers, or polyethylene terephthalate mat, having a layer of integrated mica flake paper, mica splittings or mica flakes 25 bonded thereto by a liquid resinous binder. The tape in this case is held together or bonded with up to 15 weight percent of the polybutadiene micabond composition of this invention. The tape may be applied half lapped, abutted or otherwise. Generally, a plurality of layers of the flexible composite tape 23 are wrapped about the coil, with five or more layers generally being used for high-voltage electrical machines. To impart better abrasion resistance and to secure a tighter insulation, an outer wrapping of a tape 26 of a tough fibrous material, for example, glass fiber, or the like is applied to the coil.

The porous mica insulation is preferably in the form of a winding tape of the order of one-half inch to two inches in width. For building electric machines, sheet backing material of a thickness of approximately 1 mil (0.001 in. or 0.0025 cm.), to which there has been applied a layer of from 2 mils to 10 mils thickness of mica has been successfully employed. Mica flakes are generally about 1/16 to 3/4 inch square while mica splittings are generally about 3/4 inch to 3 inches square. Integrated mica flake paper is made of compacted mica particles about 1/32 inch to 1/2 inch square and fine mica paper is made of compacted mica particles about 1/64 inch to 1/16 inch square. All of these forms of mica are useful in this invention.

EXAMPLE

Micabond formulations containing over 70 weight percent of 1,2-polybutadiene were made. They contained the following admixtures of components (A), (B), (C) and (D): (A) a low molecular weight, 100% solids admixture of: 70 weight percent of 1,2-polybutadiene 20 weight percent to 22 weight percent of trans 1,4-polybutadiene, and 6 weight percent to 8 weight percent of cis 1,4-polybutadiene. Component (A) had an average molecular weight of from 450 to 1200, as determined by gas phase chromatography, and a viscosity of 7,000 cps. at 25° C. (sold commercially by Colorado Chemical Specialities, Inc. under the Tradename RICON 157 Thermosetting resin). (B) a high molecular weight, 80% solids in heptane, admixture of 90 weight percent of 1,2-polybutadiene, 6 weight percent to 8 weight percent of trans, 1,4-polybutadiene and 2 weight percent of cis 1,4-polybutadiene. Component (B) had an average molecular weight of about 30,000, as determined by gas phase chromatography, and a viscosity of 1,000,000 cps. at 25° C. (sold commercially by Colorado Chemical Specialties, Inc. under the Tradename RICON 160 Thermosetting resin). (C) dicumyl peroxide catalyst; and (D) a 1:1 weight ratio of toluene and methyl ethyl ketone as solvent for the composition.

The formulations in terms of parts by weight, etc. are set forth in Table 1 below:

TABLE 1

| Sample | Component (A) Low Mol. Wt. Polybutadiene Mixture (Solids) | Component (B) High Mol. Wt. Polybutadiene Mixture | | Component (C) Dicumyl Peroxide | Component (D) Toluene + Methyl Ethyl Ketone | Ave. Wt. % 1,2-Polybutadiene* | Wt. Ratio Total Polybutadiene Solids:Total Solvent | Viscosity at 25° C. | Wt. % High Mol Wt. Polybutadiene Solids Based on Polybutadiene |
|---|---|---|---|---|---|---|---|---|---|
| | | (Solution) | (Solids) | | | | | | |
| 1 | 20.0 | 12.5 | 10.0 | 0.3 | 20 | 76.6% | 1:0.75 | 1-15 cps. | 33.3% |
| 2 | 20.0 | 12.5 | 10.0 | 0.6 | 20 | 76.6% | 1:0.75 | 1-15 cps. | 33.3% |
| 3 | 20.0 | 12.5 | 10.0 | 0.6 | 50 | 76.6% | 1:1.75 | 1-15 cps. | 33.3% |
| 4 | 22.5 | 9.4 | 7.5 | 0.6 | 72 | 75.0% | 1:2.41 | 1-15 cps. | 25.0% |
| 5 | 25.0 | 6.3 | 5.0 | 0.6 | 72 | 73.3% | 1:2.46 | 1-15 cps. | 16.6% |
| 6 | 22.0 | 2.5 | 2.0 | 0.48 | 73.6 | 71.6% | 1:3.05 | 1-15 cps. | 8.3% |
| 7 | 20.4 | 4.5 | 3.6 | 0.6 | 72 | 73.0% | 1:3.03 | 1-15 cps. | 15.0% |

*Calculation for Samples 1-3: (20 × 70 + 10 × 90)/30 = 76.6

Samples 1 to 7 micabond polybutadiene resin solutions were brushed onto the outside of separate six inch square pieces of integrated mica flake paper about 4 mils (0.004 inch) thick. The seven micabond coated mica paper pieces were positioned vertically in a forced air oven, having a temperature ranging from 135° C. to 150° C., for about 5 minutes. The micabond dried mica paper pieces were then removed from the oven and six inch square pieces of 1.3 mil. thick non-woven Dacron (polyethylene terephthalate) cloth backing sheet were applied to the micabond resin side. Additional micabond resin was then brushed over the backing surface. The composite was then placed in the oven at the same temperature for another four minutes. On removal from the oven and cooling, all of the dried samples had tack-free surfaces and were extremely flexible, capable of being easily bent around a 7/16 inch copper mandrel without cracking. All of the samples had from about 8 weight percent to about 12 weight percent B-staged micabond resin composition loading after drying, including about 0.5 weight percent residual solvent and were very porous and permeable to typical impregnating resins.

Subsequently, long winding tapes were made having the micabond compositions of Sample 7. These were wrapped around ½ inch × 1¼ inch cross-section steel test bars without cracking or breaking while winding. None of the micabond sample compositions would degrade power factor, dielectric strength, or breakdown voltage values for fully impregnated tapes. All of the polybutadiene formulations described in the specification would provide outstanding micabond resins for porous, ground insulation winding tapes for motor and generator coils.

We claim:

1. A porous, non-tacky, highly flexible resin bonded insulation tape comprising mica, and a contacting, curable, resinous composition consisting essentially of the admixture of: (A) polybutadiene containing from 70 weight percent to 100 weight percent of 1,2-polybutadiene, and (B) an amount of catalyst effective to cure the polybutadiene at curing temperatures, said resin bonded insulation tape being dry, highly flexible, and containing from 2 weight percent to 15 weight percent of the resinous composition based on the total weight of the resin bonded tape.

2. The porous, resin bonded insulation tape of claim 1, where the resinous composition is homogeneous and substantially unreacted.

3. The porous, resin bonded insulation tape of claim 1, where the tape comprises mica supported by a porous backing material and is permeable by impregnating resin.

4. The porous, resin bonded insulation tape of claim 1, where the composition contains from 70 weight percent to 95 weight percent of 1,2-polybutadiene and 5 weight percent to 30 weight percent of 1,4-polybutadiene, and the catalyst is selected from the group consisting of organic peroxides, and organic azo compounds.

5. The porous, resin bonded insulation tape of claim 1, where the tape can be wound onto a reel without sticking to itself.

6. The porous, resin bonded insulation tape of claim 1 wrapped around an electrical conductor to provide a mica wrapped coil.

7. A porous, resin bonded insulation tape comprising mica, and a contacting, curable, resinous composition consisting essentially of the admixture:
 (A) from about 10 weight percent to about 90 weight percent of a first polybutadiene mixture consisting essentially of from 80 weight percent to 90 weight percent solids of 1,2-polybutadiene and from 10 weight percent to 20 weight percent solids of 1,4-polybutadiene,
 (B) from about 10 weight percent to about 90 weight percent of a second polybutadiene mixture consisting essentially of from 70 weight percent to 80 weight percent solids of 1,2-polybutadiene and from 20 weight percent to 30 weight percent solids of 1,4-polybutadiene, and
 (C) an amount of catalyst effective to cure the polybutadiene at curing temperatures, and where solvent for the polybutadiene may be present, said resin bonded insulation tape being dry, non-tacky, highly flexible, and containing from 2 weight percent to 15 weight percent of the resinous composition based on the total weight of the resin bonded tape.

8. The porous, resin bonded insulation tape of claim 7, where the resinous composition is homogeneous and substantially unreacted and where up to about 1 weight percent of residual solvent for the polybutadiene may be present.

9. The porous, resin bonded insulation tape of claim 7, where the tape comprises mica supported by a porous backing material and is permeable by impregnating resin.

10. A porous, resin bonded insulation tape of claim 7, where the first polybutadiene mixture contains 90 weight percent solids of 1,2-polybutadiene and 10 weight percent solids of 1,4-polybutadiene and the second polybutadiene mixture contains 70 weight percent solids of 1,2-polybutadiene and 30 weight percent solids of 1,4-polybutadiene, the solvent is selected from the group consisting of ketones, aliphatic hydrocarbons, cycloaliphatic hydrocarbons, aromatic hydrocarbons, cyclic ethers, and mixtures thereof, and the catalyst is selected from the group consisting of organic peroxides, and organic azo compounds.

11. The porous, resin bonded insulation tape of claim 7, where the tape can be wound onto a reel without sticking to itself.

12. The porous, resin bonded insulation tape of claim 7 wrapped around an electrical conductor to provide a mica wrapped coil.

* * * * *